(12) United States Patent
Uejima et al.

(10) Patent No.: US 10,026,939 B2
(45) Date of Patent: Jul. 17, 2018

(54) BATTERY SEPARATOR PRODUCING METHOD AND BATTERY SEPARATOR PRODUCING APPARATUS

(71) Applicant: Sumitomo Chemical Company, Limited, Tokyo (JP)

(72) Inventors: Rikuri Uejima, Niihama (JP); Akihiko Shin, Daegu (KR)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/384,691

(22) Filed: Dec. 20, 2016

(65) Prior Publication Data

US 2017/0179453 A1 Jun. 22, 2017

(30) Foreign Application Priority Data

Dec. 22, 2015 (JP) .................. 2015-250568

(51) Int. Cl.
| | |
|---|---|
| *B32B 41/00* | (2006.01) |
| *H01M 2/14* | (2006.01) |
| *B32B 7/12* | (2006.01) |
| *B32B 27/32* | (2006.01) |
| *B32B 37/00* | (2006.01) |
| *B32B 37/12* | (2006.01) |

(Continued)

(52) U.S. Cl.
CPC .............. *H01M 2/145* (2013.01); *B32B 7/12* (2013.01); *B32B 27/32* (2013.01); *B32B 37/025* (2013.01); *B32B 37/12* (2013.01); *B32B 37/203* (2013.01); *H01M 2/1653* (2013.01); *H01M 2/1686* (2013.01); *B32B 2305/026* (2013.01); *B32B 2323/04* (2013.01); *B32B 2323/10* (2013.01); *B32B 2375/00* (2013.01); *B32B 2457/10* (2013.01); *H01M 10/0525* (2013.01)

(58) Field of Classification Search
CPC .. H01M 2/145; H01M 2/1653; H01M 2/1686; H01M 10/0525; B32B 27/32; B32B 37/203; B32B 7/12; B32B 37/12; B32B 37/025; B32B 2375/00; B32B 2457/10; B32B 2305/026; B32B 2323/04; B32B 2323/10
USPC .......................... 156/64, 350, 351, 378, 379
See application file for complete search history.

(56) References Cited

U.S. PATENT DOCUMENTS

| | | |
|---|---|---|
| 2011/0052962 A1 | 3/2011 | Suzuki et al. |
| 2014/0374947 A1* | 12/2014 | Ichinomiya .......... B29D 99/005 264/175 |

FOREIGN PATENT DOCUMENTS

| | | |
|---|---|---|
| JP | 2011-181459 A | 9/2011 |
| JP | 2015037058 A | 2/2015 |

(Continued)

OTHER PUBLICATIONS

Office Action dated Jun. 9, 2017 in KR Application No. 10-2016-0171553.

(Continued)

*Primary Examiner* — Michael N Orlando
*Assistant Examiner* — Joshel Rivera
(74) *Attorney, Agent, or Firm* — Panitch Schwarze Belisario & Nadel LLP

(57) ABSTRACT

A transfer system includes an expander roll for removing a wrinkle in a separator original sheet, and (i) the expander roll and (ii) a transfer roller immediately followed by or following the expander roll are spaced from each other at a distance of not less than 1 m and not more than 10 m.

12 Claims, 9 Drawing Sheets

(51) Int. Cl.
*B32B 37/20* (2006.01)
*H01M 2/16* (2006.01)
*H01M 10/0525* (2010.01)

(56) References Cited

FOREIGN PATENT DOCUMENTS

| JP | 5815909 B1 | 11/2015 |
| KR | 101350602 B1 | 1/2014 |
| KR | 20140107256 A | 9/2014 |
| KR | 101572289 B1 | 11/2015 |

OTHER PUBLICATIONS

Office Action dated Nov. 6, 2017 in KR Application No. 10-2016-0171553.
Office Action dated May 29, 2018 in KR Application No. 10-2016-0171553.

* cited by examiner (a)
DEVELOPING AND SPREADING DIRECTION (TRANSFERRING DIRECTION)

X (b)
DEVELOPING AND SPREADING DIRECTION (TRANSFERRING DIRECTION)

X (c)
DEVELOPING AND SPREADING DIRECTION (TRANSFERRING DIRECTION)

BATTERY SEPARATOR PRODUCING METHOD AND BATTERY SEPARATOR PRODUCING APPARATUS

This Nonprovisional application claims priority under 35 U.S.C. § 119 on Patent Application No. 2015-250568 filed in Japan on Dec. 22, 2015, the entire contents of which are hereby incorporated by reference.

TECHNICAL FIELD

The present invention relates to a battery separator producing method and to a battery separator producing apparatus.

BACKGROUND ART

There has been known a coated separator (laminated porous film) producing method in which a belt-like porous film that is transferred by a transfer system including a plurality of transfer rollers is coated with a coating solution while being transferred (Patent Literature 1).

Patent Literature 1 shows the following knowledge. Specifically, a longer distance between two transfer rollers that are adjacent to each other in a direction in which a battery separator is transferred (hereinafter also referred to as a "roller span") causes the battery separator to easily have a wrinkle in one of the two adjacent transfer rollers which one is located on the downstream side in the direction in which the battery separator is transferred. Thus, any adjacent transfer rollers of the transfer system preferably have a roller span of not more than 1 m.

CITATION LIST

Patent Literature

[Patent Literature 1]
Japanese Patent Application Publication Tokukai No. 2011-181459 (Publication date: Sep. 15, 2011)

SUMMARY OF INVENTION

Technical Problem

Note, however, that according to such a conventional technique as described earlier, since adjacent transfer rollers of a transfer system have a short roller span, it is unfortunately difficult to obtain a work space for an operation necessary for production of a laminated porous film.

The present invention has been made in view of the problem, and an object of the present invention is to provide a battery separator producing method and a battery separator producing apparatus each of which makes it possible to obtain a work space for an operation necessary for production of a battery separator while preventing appearance of a wrinkle in the battery separator.

Solution to Problem

In order to attain the object, a battery separator producing method in accordance with an aspect of the present invention includes the step of: a) producing a battery separator by causing a transfer system including a plurality of transfer rollers to transfer the battery separator, the transfer system further including at least one expander roll, (i) the at least one expander roll and (ii) a transfer roller immediately followed by or following the at least one expander roll being spaced from each other at a distance of not less than 1 m and not more than 10 m.

In order to attain the object, a battery separator producing apparatus in accordance with an aspect of the present invention includes: a transfer system including a plurality of transfer rollers and transferring a battery separator, the transfer system further including at least one expander roll, (i) the at least one expander roll and (ii) a transfer roller immediately followed by or following the at least one expander roll being spaced from each other at a distance of not less than 1 m and not more than 10 m.

Advantageous Effects of Invention

The present invention yields an effect of providing a battery separator producing method and a battery separator producing apparatus each of which makes it possible to obtain a work space for an operation necessary for production of a battery separator while preventing appearance of a wrinkle in the battery separator.

Figure 10:
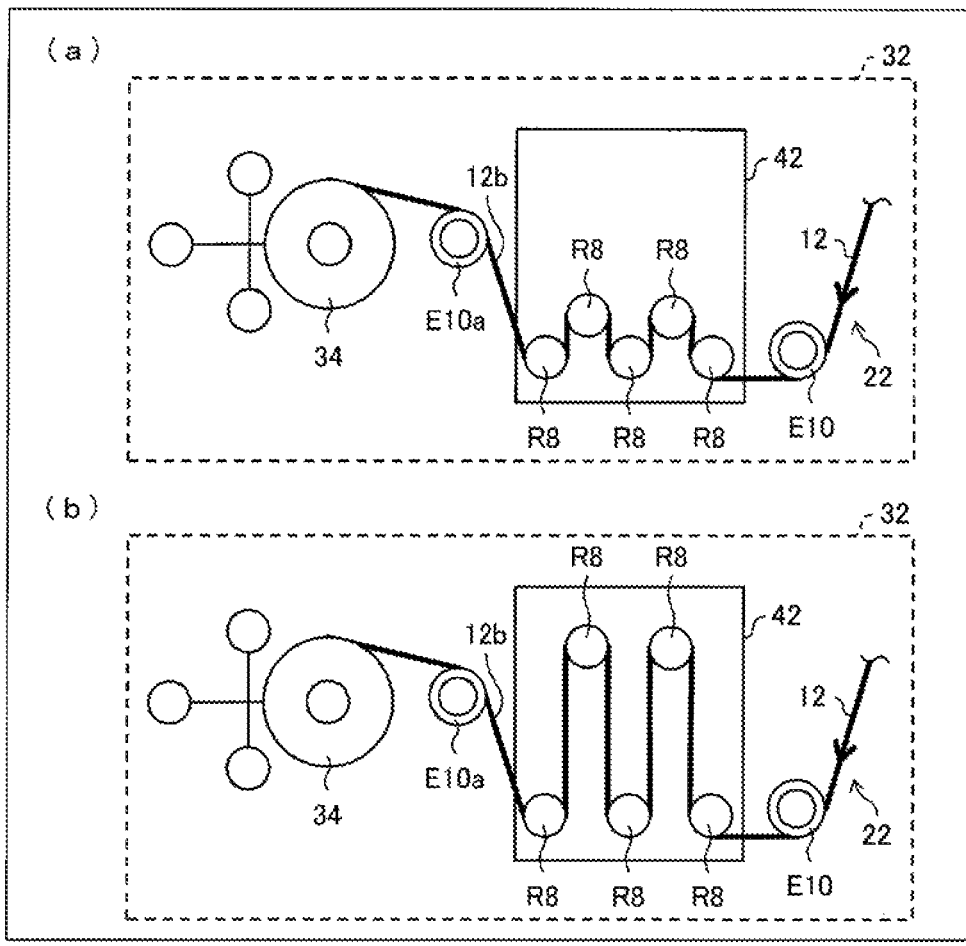

(a) and (b) of FIG. 10 are diagrams schematically illustrating a configuration of a winding device that is provided in the separator original sheet producing system.

Figure 11:
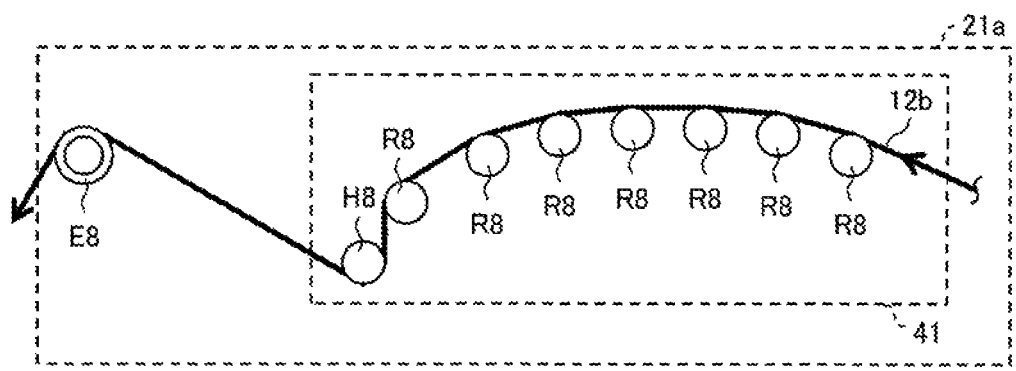

FIG. 11 is a diagram schematically illustrating a configuration of a separator original sheet producing system in accordance with Embodiment 2.

Figure 12:
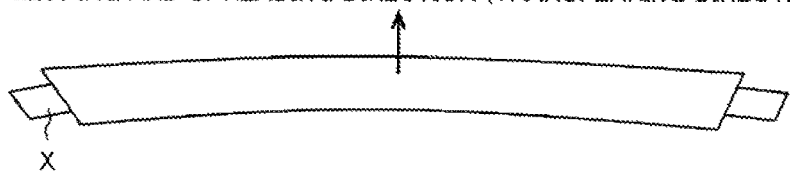
Figure 12:
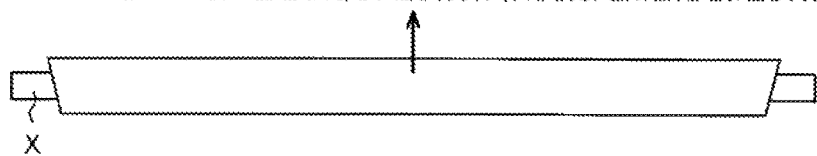
Figure 12:
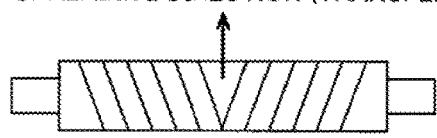

(a) of FIG. 12 illustrates a curved expander roll, (b) of FIG. 12 illustrates a linear expander roll, and (c) of FIG. 12 illustrates an expander roll having spiral a groove.

DESCRIPTION OF EMBODIMENTS

The following description will discuss embodiments of the present invention in detail.

Embodiment 1

The following description will discuss, in order, a lithium-ion secondary battery, a battery separator, and a heat-resistant separator in accordance with Embodiment 1.

<Lithium-Ion Secondary Battery>

A nonaqueous electrolyte secondary battery, typically, a lithium-ion secondary battery has a high energy density. Therefore, the nonaqueous electrolyte secondary battery is currently widely used as batteries for use in devices such as personal computers, mobile phones, and mobile information terminals, and for use in moving bodies such as automobiles and airplanes. The nonaqueous electrolyte secondary battery is also widely used as stationary batteries contributing to stable supply of electric power.

Figure 1:
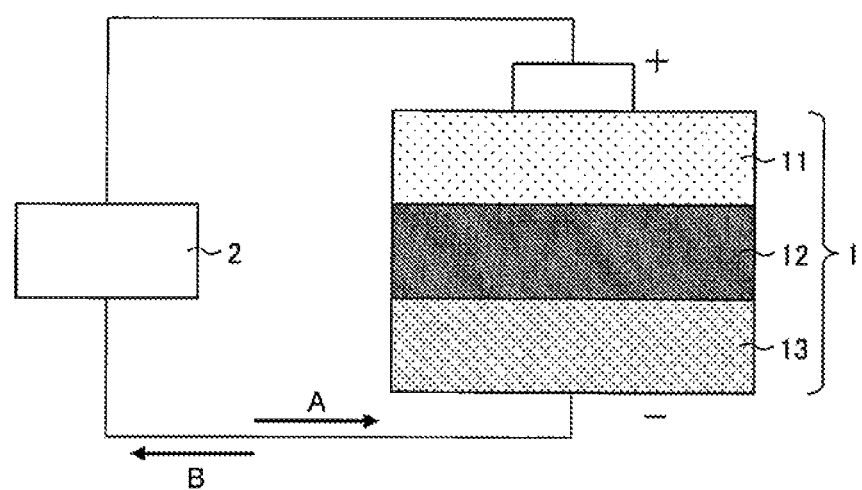
FIG. 1 is a diagram schematically illustrating a cross-sectional configuration of a lithium-ion secondary battery in accordance with Embodiment 1.

FIG. 1 is a diagram schematically illustrating a cross-sectional configuration of a lithium-ion secondary battery 1. As illustrated in FIG. 1, the lithium-ion secondary battery 1 includes a cathode 11, a separator 12, and an anode 13. Between the cathode 11 and the anode 13, an external device 2 is connected outside the lithium-ion secondary battery 1. Then, while the lithium-ion secondary battery 1 is being charged, electrons move in a direction A. On the other hand, while the lithium-ion secondary battery 1 is being discharged, electrons move in a direction B.

<Separator>

The separator 12 is provided so as to be sandwiched between the cathode 11 which is a positive electrode of the lithium-ion secondary battery 1 and the anode 13 which is a negative electrode of the lithium-ion secondary battery 1. The separator 12 is a porous film which separates the cathode 11 and the anode 13. This allows lithium ions to move between the cathode 11 and the anode 13. The separator 12 contains, for example, polyolefin such as polyethylene or polypropylene as a material.

Figure 2:
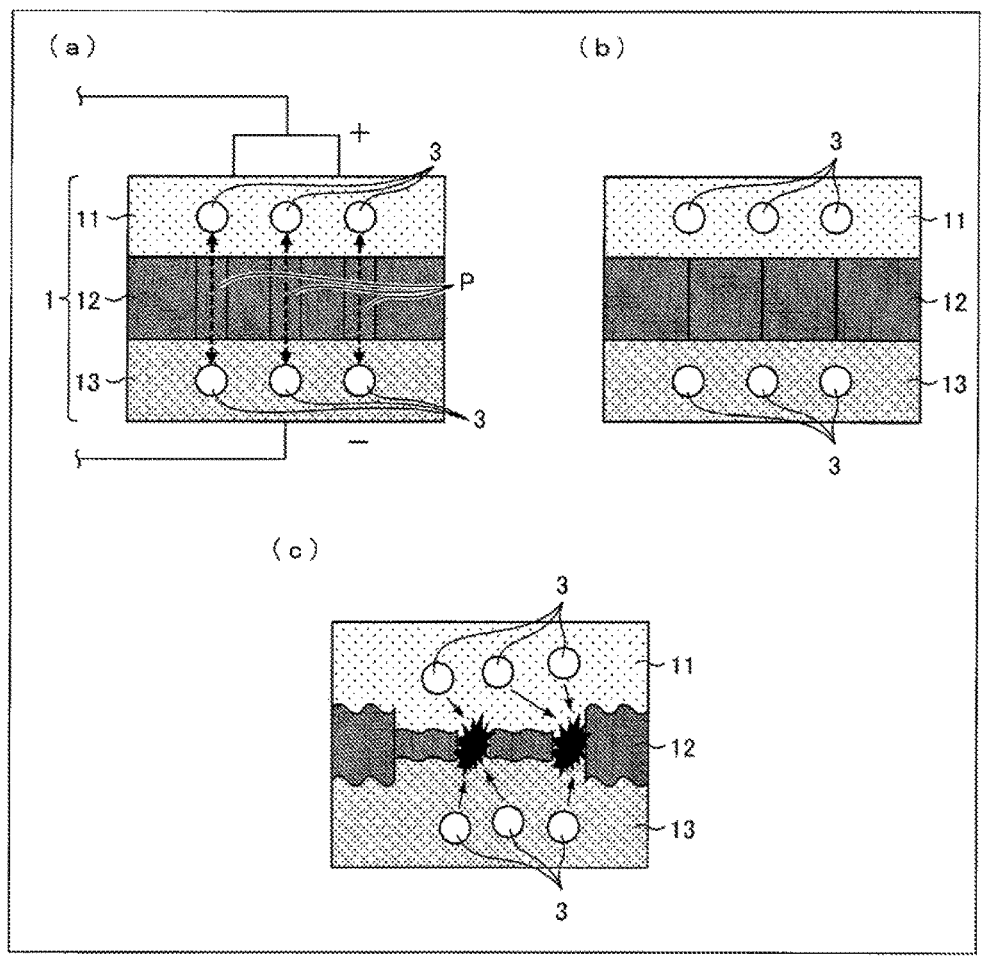
FIG. 2 provides diagrams schematically illustrating details of the configuration of the lithium-ion secondary battery illustrated in FIG. 1.

FIG. 2 provides diagrams schematically illustrating details of the configuration of the lithium-ion secondary battery 1 illustrated in FIG. 1. (a) of FIG. 2 illustrates a normal configuration. (b) of FIG. 2 illustrates a state in which a temperature of the lithium-ion secondary battery 1 has risen. (c) of FIG. 2 illustrates a state in which a temperature of the lithium-ion secondary battery 1 has sharply risen.

As illustrated in (a) of FIG. 2, the separator 12 is provided with many pores P. Normally, lithium ions 3 in the lithium-ion secondary battery 1 can move back and forth through the pores P.

However, there are, for example, cases in which the temperature of the lithium-ion secondary battery 1 rises due to excessive charging of the lithium-ion secondary battery 1, a high current caused by short-circuiting of the external device, or the like. In such cases, the separator 12 melts or softens, and the pores P are blocked as illustrated in (b) of FIG. 2. As a result, the separator 12 contracts. This stops the above back-and-forth movement of the lithium ions 3, and consequently stops the above temperature rise.

However, in a case where a temperature of the lithium-ion secondary battery 1 sharply rises, the separator 12 suddenly contracts. In this case, as illustrated in (c) of FIG. 2, the separator 12 may be destroyed. Then, the lithium ions 3 leak out from the separator 12 which has been destroyed. As a result, the lithium ions 3 do not stop moving back and forth. Consequently, the temperature continues rising.

<Heat-Resistant Separator>

Figure 3:
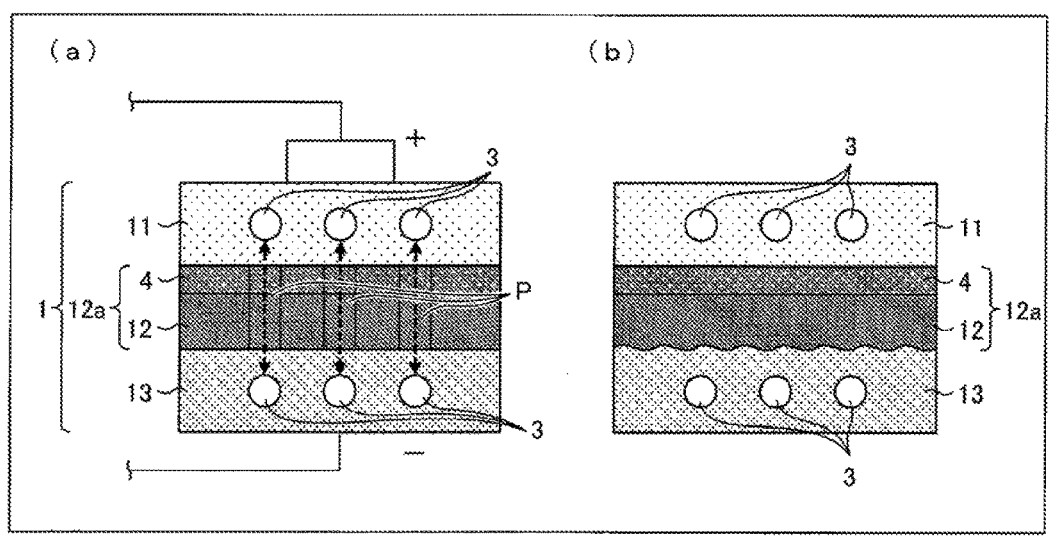
FIG. 3 provides diagrams schematically illustrating another configuration of the lithium-ion secondary battery illustrated in FIG. 1.

FIG. 3 provides diagrams schematically illustrating another configuration of the lithium-ion secondary battery 1 illustrated in FIG. 1. (a) of FIG. 3 illustrates a normal configuration, and (b) of FIG. 3 illustrates a state in which a temperature of the lithium-ion secondary battery 1 has sharply risen.

As illustrated in (a) of FIG. 3, the lithium-ion secondary battery 1 can further include a heat-resistant layer 4. The heat-resistant layer 4 and the separator 12 form a heat-resistant separator 12a (separator). The heat-resistant layer 4 is laminated on a surface of the separator 12 which surface is on a cathode 11 side. Note that the heat-resistant layer 4 can be alternatively laminated on a surface of the separator 12 which surface is on an anode 13 side, or on both surfaces of the separator 12. Further, the heat-resistant layer 4 is provided with pores which are similar to the pores P. Normally, the lithium ions 3 move back and forth through the pores P and the pores of the heat-resistant layer 4. The heat-resistant layer 4 contains, for example, wholly aromatic polyamide (aramid resin) as a material.

As illustrated in (b) of FIG. 3, even in a case where the temperature of the lithium-ion secondary battery 1 sharply rises and accordingly the separator 12 has melted or softened, the shape of the separator 12 is maintained because the heat-resistant layer 4 supports the separator 12. Therefore, such a sharp temperature rise results in only melting or softening of the separator 12 and consequent blocking of the pores P. This stops back-and-forth movement of the lithium ions 3 and consequently stops the above-described excessive discharging or excessive charging. In this way, the separator 12 can be prevented from being destroyed.

<Steps of Producing Heat-Resistant Separator Original Sheet (Separator Original Sheet)>

How to produce the heat-resistant separator 12a of the lithium-ion secondary battery 1 is not specifically limited. The heat-resistant separator 12a can be produced by a publicly known method. The following discussion assumes a case where the separator 12 contains polyethylene as a main material. However, even in a case where the separator 12 contains another material, similar steps can still be applied to production of the heat-resistant separator 12a.

For example, it is possible to employ a method including the steps of first forming a film by adding an inorganic filler or plasticizer to a thermoplastic resin, and then removing the inorganic filler or plasticizer with an appropriate solvent. For example, in a case where the separator 12 is a polyolefin separator made of a polyethylene resin containing ultra-high molecular weight polyethylene, it is possible to produce the separator 12 by the following method.

This method includes (1) a kneading step of obtaining a polyethylene resin composition by kneading an ultra-high molecular weight polyethylene with an inorganic filler (for example, calcium carbonate or silica) or plasticizer (for example, a low molecular weight polyolefin or liquid paraffin), (2) a rolling step of forming a film with the polyethylene resin composition, (3) a removal step of removing the inorganic filler or plasticizer from the film obtained in the step (2), and (4) a stretching step of obtaining the separator 12 by stretching the film obtained in the step (3). The step (4) can alternatively be carried out between the steps (2) and (3).

In the removal step, many fine pores are provided in the film. The fine pores of the film stretched in the stretching step become the above-described pores P. The separator 12 formed as a result is a polyethylene microporous film having a prescribed thickness and a prescribed air permeability.

Note that, in the kneading step, 100 parts by weight of the ultra-high molecular weight polyethylene, 5 parts by weight to 200 parts by weight of a low molecular weight polyolefin having a weight-average molecular weight of 10000 or less, and 100 parts by weight to 400 parts by weight of the inorganic filler can be kneaded.

Thereafter, in a coating step, the heat-resistant layer 4 is formed on a surface of the separator 12. For example, the heat-resistant layer 4 which is an aramid heat-resistant layer is formed by coating the separator 12 with an aramid/NMP (N-methylpyrrolidone) solution (coating solution). The heat-resistant layer 4 can be provided on only one surface or both surfaces of the separator 12. Alternatively, the heat-resistant layer 4 can be formed by using, for coating, a suspension containing an inorganic filler, such as a suspension containing alumina, carboxymethyl cellulose, and water.

Further, in the coating step, an adhesive layer can be formed on the surface of the separator 12 by coating a surface of the separator 12 (a coating step) with a polyvinylidene fluoride/dimethylacetamide solution (coating solution) and solidifying the polyvinylidene fluoride/dimethylacetamide solution (a depositing step). The adhesive layer can be provided on only one surface or both surfaces of the separator 12.

A method for coating the separator 12 with the coating solution is not specifically limited provided that uniform wet coating can be carried out by the method. The method can be a conventionally publicly known method such as a capillary coating method, a slit die coating method, a spray coating method, a dip coating method, a roll coating method, a screen printing method, a flexo printing method, a bar coater method, a gravure coater method, or a die coater method. The heat-resistant layer 4 has a thickness which can be controlled by adjusting a thickness of a coating wet film, or a solid-content concentration in the coating solution.

<Configuration of Heat-Resistant Separator Original Sheet>

Figure 4:
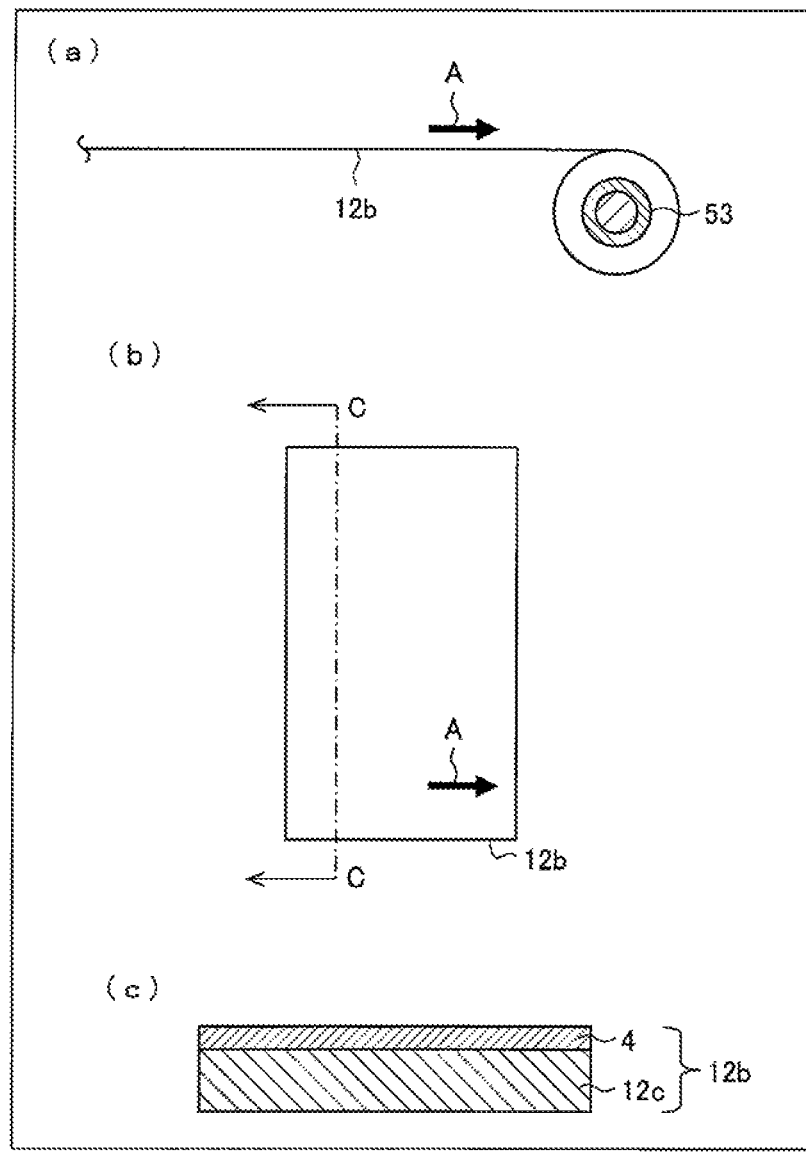
FIG. 4 provides diagrams illustrating an original sheet of a heat-resistant separator (hereinafter referred to as a "heat-resistant separator original sheet"), which is an original sheet of a separator (hereinafter referred to as a "separator original sheet") on which a heat-resistant layer of the another configuration is laminated.

FIG. 4 provides diagrams illustrating a heat-resistant separator original sheet 12b (battery separator, laminated porous film) that includes a separator original sheet 12c (polyolefin porous film) and a heat-resistant layer 4 (porous layer) laminated on the separator original sheet 12c. (a) of FIG. 4 illustrates how the heat-resistant separator original sheet 12b is wound, (b) of FIG. 4 is a plan view of the heat-resistant separator original sheet 12b, and (c) of FIG. 4 is a cross-sectional view taken from line C-C of (b) of FIG. 4. A "separator original sheet" refers to a wide separator that has not been slit. An "original sheet" generally refers to a film or paper that has not been processed. In particular, the "original sheet" which indicates an original sheet of a separator is referred to as a "separator original sheet".

The production method (described earlier) makes it possible to produce the heat-resistant separator original sheet (laminated porous film, hereinafter merely referred to as "separator original sheet") 12b that includes the separator original sheet 12c and the heat-resistant layer 4 laminated on the separator original sheet 12c. The separator original sheet 12b thus produced is transferred in a direction of an arrow A so as to be wound around a core 53 having a cylindrical shape ((a) and (b) of FIG. 4). Note that a product to be produced by the above production method is not limited to the separator original sheet 12b. The production method can include no coating step. A product to be produced by the production method which includes no coating step is the separator original sheet 12c on which no heat-resistant layer 4 is laminated. The following discussion mainly takes, as an example, the separator 12b (film) which includes the heat-resistant layer 4 as a functional layer. Note, however, that a separator (film) and a separator original sheet (film original sheet) each including no functional layer can also be subjected to a similar process (step).

<Configuration of Separator Original Sheet Producing System 21>

Figure 5:
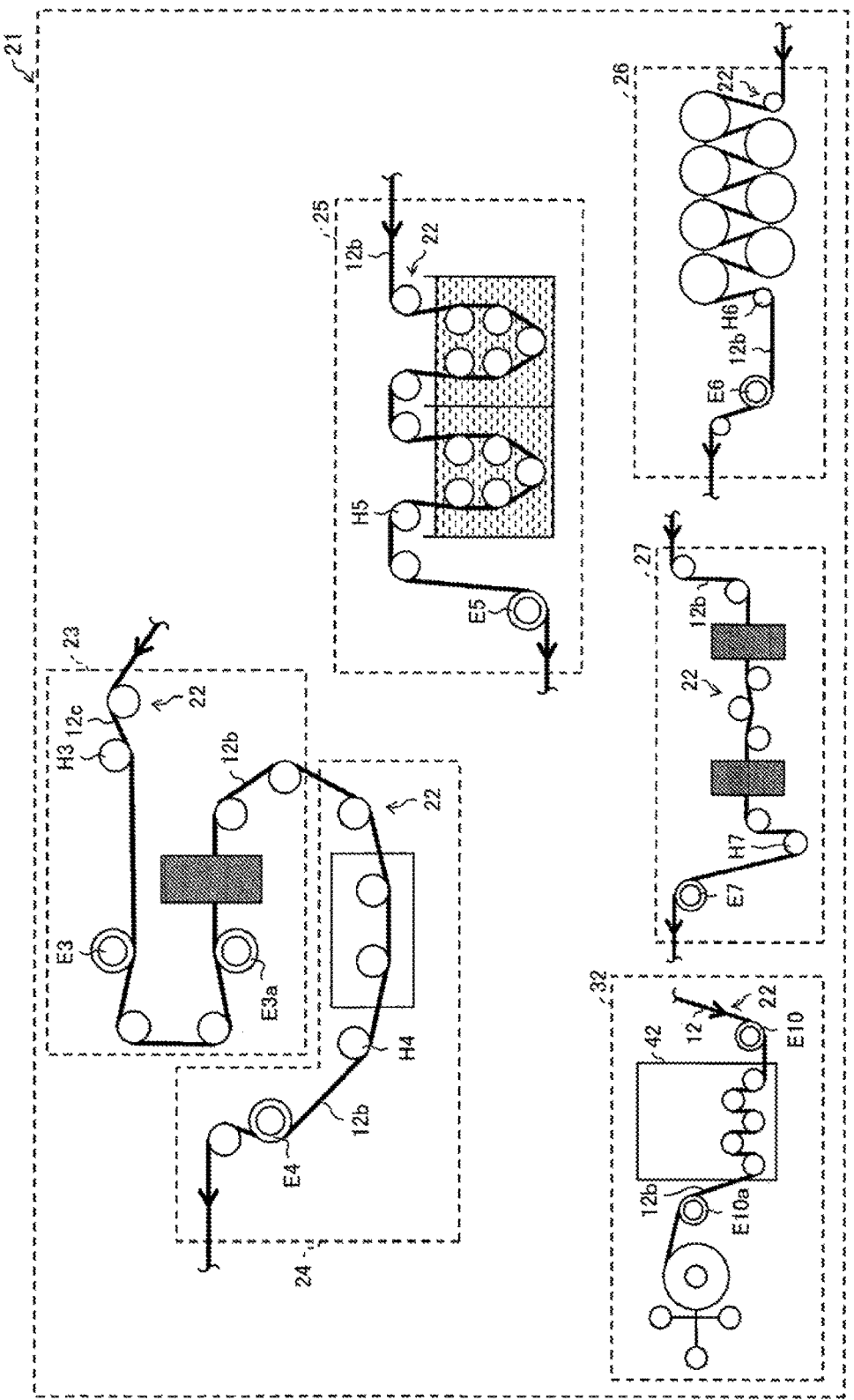
FIG. 5 is a diagram schematically illustrating a configuration of a separator original sheet producing system for producing a separator original sheet of the lithium-ion secondary battery.

FIG. 5 is a diagram schematically illustrating a configuration of a separator original sheet producing system 21 (battery separator producing apparatus) for producing the separator original sheet 12b of the lithium-ion secondary battery.

The separator original sheet producing system 21 produces the separator original sheet 12b in which the heat-resistant layer 4 ((c) of FIG. 4) is provided on the separator original sheet 12c which is transferred by a transfer system 22. The separator original sheet producing system 21 includes a coating device 23, a deposition device 24, a cleaning device 25, a drying device 26, an inspection device 27, and a winding device 32. Note that the separator original sheet producing system 21 does not need to include all the above devices. The separator original sheet producing system 21 does not need to include one or more devices selected from the coating device 23, the deposition device 24, the cleaning device 25, the drying device 26, the inspection device 27, and the winding device 32, and can include a device(s) different from these devices.

The coating device 23 coats, with the coating solution, the separator original sheet 12c which has been stretched in the stretching step (described earlier) and transferred by the transfer system 22 (the coating step). The deposition device 24 solidifies the coating solution with which the separator original sheet 12c has been coated by the coating device 23 (the depositing step). The cleaning device 25 cleans the separator original sheet 12b in which the heat-resistant layer 4 has been formed by the solidification of the coating solution by the deposition device 24 (a cleaning step). The drying device 26 dries the separator original sheet 12b which has been cleaned by the cleaning device 25. The inspection device 27 inspects the separator original sheet 12b which has been dried by the drying device 26 (an inspection step). The winding device 32 winds the separator original sheet 12b which has been inspected by the inspection device 27.

For example, the separator original sheet 12b, which is a laminated porous film, has a thickness of 18.2 µm, a weight per unit area, which is indicative of a mass per unit area, of 7 g/m², and an air permeability of 89 sec/100 ml. Since the separator original sheet 12b is made thin by being stretched in the stretching step (described earlier), it is difficult to cause high tension during the transfer of the separator original sheet 12b. This makes it easier for a wrinkle to appear in the separator original sheet 12b. Further, it is desired that a separator have a thinner thickness and that a separator which is being produced be transferred at a higher speed so that higher productivity is achieved. A separator which has a thinner thickness or a separator which is transferred at a higher speed more easily has a wrinkle.

Any paired adjacent transfer rollers of a plurality of transfer rollers that is included in the transfer system 22 are spaced from each other at a distance of less than 1 m and preferably of not more than 0.6 m. This makes it possible to prevent, at each place in the transfer system 22, appearance of a wrinkle in the separator original sheet 12b which is transferred by the transfer system 22.

A distance between paired adjacent transfer rollers (including expander rolls) herein means a distance between a place at which a battery separator leaves a first transfer roller and a place at which the battery separator contacts a second roller following the first roller.

<Coating Device and Deposition Device>

Figure 6:
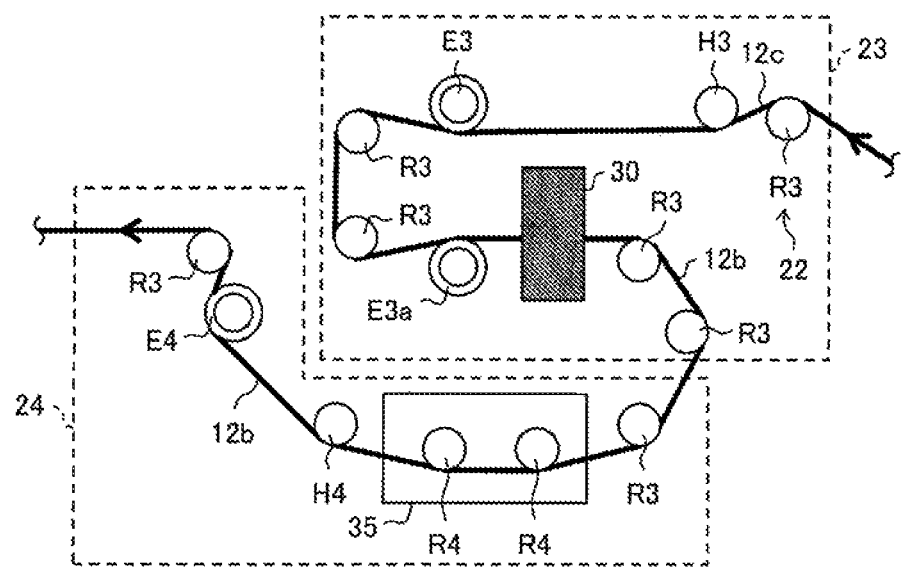
FIG. 6 is a diagram schematically illustrating a configuration of a coating device and a humidity deposition device that are provided in the separator original sheet producing system.

FIG. 6 is a diagram schematically illustrating a configuration of the coating device 23 and the deposition device 24 that are provided in the separator original sheet producing system 21. The coating device 23 includes a coating section 30 for coating, with the coating solution, the separator original sheet 12c which is transferred by a plurality of transfer rollers R3 that is included in the transfer system 22. The coating section 30 causes a coating roller to coat the separator original sheet 12c with the coating solution.

In a case where one of the transfer rollers R3 which contact the separator original sheet 12c which is horizontally transferred above the coating section 30 is located right above the coating section 30, dust (foreign matter) may fall from the one of the transfer rollers R3 to the coating section 30. In view of this, an expander roll E3 is provided on the downstream side of the separator original sheet 12c which is horizontally transferred above the coating section 30, and a transfer roller H3 immediately followed by the expander roll E3 is provided on the upstream side of the separator original sheet 12c so as to be spaced from the expander roll E3 at a distance of not less than 1 m. This allows no transfer roller R3 to be provided right above the coating section 30. Therefore, it is possible to remove fear that dust (foreign matter) may fall from a transfer roller R3 to the coating section 30.

An expander roll E3a is provided upstream of the coating section 30 so as to be adjacent to the coating section 30. In a case where the expander roll E3a smooths a wrinkle in the separator original sheet 12c before coating, nonuniform coating can be prevented from occurring in the separator original sheet 12b. The separator original sheet 12b which has been coated with the coating solution by the coating roller of the coating section 30 is discharged from the coating device 23 by being transferred by a transfer roller R3.

In a case where the separator original sheet 12c is coated with the coating solution, an edge portion of the separator original sheet 12c which extends in a width direction thereof has a difference in level between a surface of the separator original sheet 12c and an edge of the coating solution with which the separator original sheet 12c has been coated. Appearance of a wrinkle easily originates from the difference in level at the edge portion of the separator original sheet 12c which extends in the width direction.

Paired adjacent transfer rollers R3 of the plurality of transfer rollers R3 which is provided in the coating device 23 are spaced from each other at a distance preferably of less than 1 m, and more preferably of not more than 0.6 m. Further, the paired adjacent transfer rollers R3 are spaced from each other at a distance preferably of not less than 0.4 m and less than 1 m, and more preferably of not less than 0.4 m and not more than 0.6 m. The configuration makes it possible to prevent, at each place in the transfer system 22, appearance of a wrinkle in the separator original sheet 12b or 12c which is transferred by the transfer system 22.

The deposition device 24 includes a depositing tank 35 for solidifying the coating solution with which the separator original sheet 12b has been coated, a plurality of transfer rollers R4 for the separator original sheet 12b which is transferred in the depositing tank 35, an expander roll E4 for expanding the separator original sheet 12b, and a transfer roller H4 which is provided so as to be immediately followed by the expander roll E4 and around which the separator original sheet 12b which has come out of the depositing tank 35 is wound first. The depositing tank 35 is supplied with a poor solvent such as water vapor so that the coating solution is solidified.

The expander roll E4 and the transfer roller H4 which is provided so as to be immediately followed by the expander roll E4 are spaced from each other at a distance of not less than 1 m and not more than 10 m. This allows the transfer roller H4 around which the separator original sheet 12b which has come out of the depositing tank 35 is wound first to be the transfer roller which is provided so as to be immediately followed by the expander roll. Thus, it is possible to obtain a space for cleaning of the transfer roller H4 which tends to be easily made dirty by a residual component that has adhered to the separator original sheet 12b in the depositing tank 35. Further, the expander roll E4 preferably contacts a first surface of the separator original sheet 12b which first surface faces away from a second surface of the separator original sheet 12b on which second surface the heat-resistant layer 4 has been formed by coating the separator original sheet 12b with the coating solution. This makes it possible to prevent the heat-resistant layer 4 thus formed from being damaged by contacting the expander roll E4. The deposition device 24 is configured such that paired adjacent transfer rollers R4 that transfer the separator original sheet 12b are spaced from each other at a distance preferably of not more than 0.8 m, more preferably of not more than 0.4 m, and still more preferably of not more than 0.3 m. With the configuration, in a case where a distance between the rollers is made extremely short, appearance of a wrinkle in the separator original sheet 12b can be prevented in the deposition device 24 in which a wrinkle easily appears in the separator original sheet 12b. According to the deposition device 24, in which the separator original sheet 12b contacts the poor solvent, a wrinkle tends to easily appear in the separator original sheet 12b due to, for example, a resistance of the poor solvent. Especially in a case where the poor solvent is water or water vapor, a wrinkle tends to easily appear.

<Cleaning Device>

Figure 7:
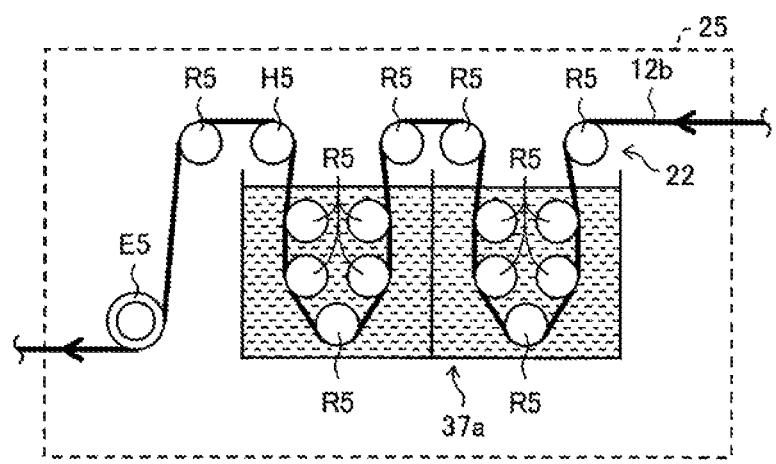
FIG. 7 is a diagram schematically illustrating a configuration of a cleaning device that is provided in the separator original sheet producing system.

FIG. 7 is a diagram schematically illustrating a configuration of the cleaning device 25 which is provided in the separator original sheet producing system 21. The cleaning device 25 cleans the separator original sheet 12b which includes the separator original sheet 12c and the heat-resistant layer 4 which has been formed by coating the separator original sheet 12c with the coating solution. The cleaning device 25 includes a cleaning tank 37a. The separator original sheet 12b is cleaned while passing through the cleaning tank 37a by being transferred by a plurality of transfer rollers R5 that is included in the transfer system 22.

The transfer system 22 further includes an expander roll E5 that is provided downstream of a transfer roller H5 that the separator original sheet 12b which has come out of the cleaning tank 37a of the cleaning device 25 contacts first. The expander roll E5 and the transfer roller H5 which is provided upstream of the expander roll E5 are spaced from each other at a distance of at a distance of not less than 1 m and not more than 10 m. The transfer roller H5 which is located last in the cleaning tank 37a is thus assumed to be the transfer roller which is provided upstream of the expander roll E5. This makes it possible to obtain a space for cleaning of the transfer roller H5 which is located last in the cleaning tank 37a and tends to be easily made dirty by a residual component that has adhered to the separator original sheet 12b. Further, the expander roll E5 preferably contacts the first surface of the separator original sheet 12b which first surface faces away from the second surface of the separator original sheet 12b on which second surface the heat-resistant layer 4 is provided. This makes it possible to prevent the heat-resistant layer 4 from being damaged by contacting the expander roll E5.

According to the cleaning device 25, paired adjacent transfer rollers R5 that transfer the separator original sheet 12b and are provided in a liquid that is contained in the cleaning tank 37a of the cleaning device 25 are spaced from each other at a distance preferably of not more than 0.8 m, and more preferably of not more than 0.4 m. With the configuration, in the cleaning step in which a wrinkle easily appears in the separator original sheet 12b due to a resistance of the liquid that is contained in the cleaning tank 37a, appearance of a wrinkle in the separator original sheet 12b can be prevented by making a distance between the rollers extremely short. The liquid that is contained in the cleaning tank 37a is normally a poor solvent of the coating solution with which the separator original sheet 12c has been coated by the coating device 23. Especially in a case where the poor solvent is water and the separator original sheet 12b passes through the water, a wrinkle tends to easily appear in the separator original sheet 12b.

<Drying Device>

Figure 8:
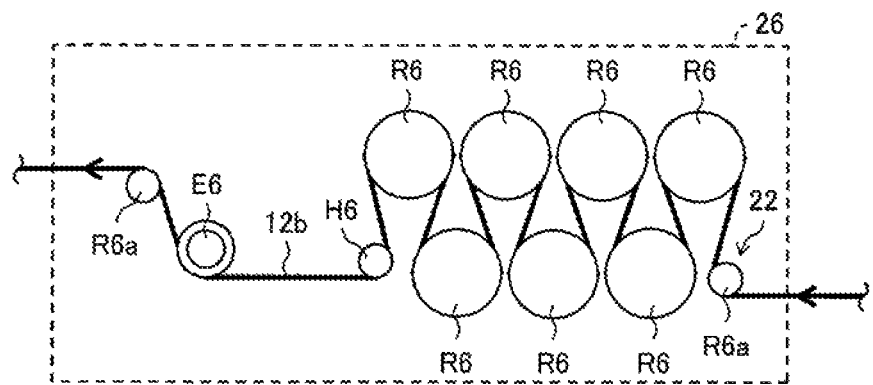
FIG. 8 is a diagram schematically illustrating a configuration of a drying device that is provided in the separator original sheet producing system.

FIG. 8 is a diagram schematically illustrating a configuration of the drying device 26 which is provided in the separator original sheet producing system 21. The drying device 26 dries the separator original sheet 12b which includes the separator original sheet 12c and the heat-resistant layer 4 which has been formed by coating the separator original sheet 12c with the coating solution. A plurality of transfer rollers R6a and R6 transfer the separator original sheet 12b. A plurality of transfer rollers R6 whose inside is supplied with a heating medium dries the separator original sheet 12b which is transferred while being wound around a surface of the plurality of transfer rollers R6.

The drying device 26 includes paired adjacent transfer rollers R6 which transfer the separator original sheet 12b and whose inside is supplied with a heating medium so as to dry the separator original sheet 12b which is being transferred while contacting a surface of the paired adjacent transfer rollers R6. The transfer rollers R6 are spaced from each other at a distance preferably of not more than 0.8 m, more preferably of not more than 0.4 m, and still more preferably of 0.3 m. This makes it possible to prevent appearance of a wrinkle in the separator original sheet 12b which is transferred in the drying device 26 in which a conspicuous wrinkle easily appears in the separator original sheet 12b.

The transfer system 22 includes a transfer roller H6 that is provided downstream of the plurality of transfer rollers R6 and an expander roll E6 that is provided downstream of the transfer roller H6. The expander roll E6 and the transfer roller H6 which is provided so as to be immediately followed by the expander roll E6 are spaced from each other at a distance of not less than 1 m and not more than 10 m.

<Inspection Device>

Figure 9:
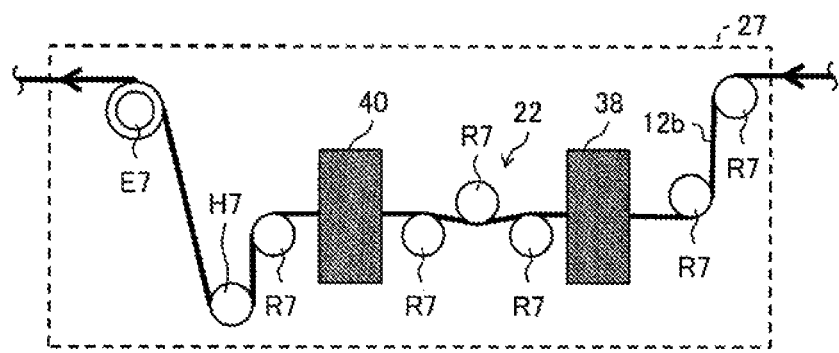
FIG. 9 is a diagram schematically illustrating a configuration of an inspection device that is provided in the separator original sheet producing system.

FIG. 9 is a diagram schematically illustrating a configuration of the inspection device 27 which is provided in the separator original sheet producing system 21.

The inspection device 27 inspects the separator original sheet 12b which includes the separator original sheet 12c and the heat-resistant layer 4 which has been formed by coating the separator original sheet 12c with the coating solution. The separator original sheet 12b which is transferred by a plurality of transfer rollers R7 that is included in the transfer system 22 is subjected to an inspection (e.g., a pinhole inspection or a coating inspection) that is carried out by an inspection section 38. Further, the separator original sheet 12b is marked by a marking section 40. The transfer system 22 further includes an expander roll E7 that is provided so as to prevent appearance of a wrinkle in the separator original sheet 12b which has been inspected by the inspection section 38.

The expander roll E7 and a transfer roller H7 that is provided so as to be immediately followed by the expander roll E7 are spaced from each other at a distance of not less than 1 m and not more than 10 m. This makes it possible to dry, before the separator original sheet 12b is transferred to the expander roll E7, ink with which the separator original sheet 12b has been applied so as to be marked by the marking section in accordance with a result of the inspection by the inspection section 38.

Paired adjacent transfer rollers R7 of a plurality of transfer rollers R7 that is provided in the inspection device 27 are spaced from each other at a distance preferably of less than 1 m, and more preferably of not more than 0.6 m. Further, the paired adjacent transfer rollers R7 are spaced from each other at a distance preferably of not less than 0.3 m and less than 1 m, and more preferably of not less than 0.3 m and not more than 0.6 m. The configuration makes it possible to prevent, at each place in the inspection device 27, appearance of a wrinkle in the separator original sheet 12b which is transferred by the transfer system 22.

<Winding Device>

(a) and (b) of FIG. 10 are diagrams schematically illustrating a configuration of the winding device 32 which is provided in the separator original sheet producing system 21. The transfer system 22 which is provided in the winding device 32 includes an expander roll E10, a plurality of transfer rollers R8 that is provided downstream of the expander roll E10, an expander roll E10a that is provided downstream of the plurality of transfer rollers R8, and a winding roller 34 that is provided downstream of the expander roll E10a. The separator original sheet 12b which has been inspected by the inspection device 27 is transferred by the expander roll E10, the plurality of transfer rollers R8, and the expander roll E10a so as to be wound by the winding roller 34.

The plurality of transfer rollers R8 constitute a film accumulator 42 that absorbs a difference in film transfer speed between the producing apparatus and the winding device, the difference arising during winding of a film onto a new roller. A wrinkle easily appears in the separator original sheet 12b before and after the separator original sheet 12b is subjected to operation of the film accumulator 42 in which the transfer rollers R8 move up and down as illustrated in (a) and (b) of FIG. 10. In a case where the expander roll E10 is provided so as to be followed by the film accumulator 42, and the expander roll E10a is provided so as to follow the film accumulator 42, it is possible to prevent appearance of a wrinkle in the separator original sheet 12b. A distance between the respective plurality of transfer rollers R8 in the film accumulator 42 herein refers to a distance between adjacent transfer rollers R8 in a case where every other transfer roller R8 of the plurality of transfer rollers R8 moves down to a place which is illustrated in (a) of FIG. 10 and at which adjacent transfer rollers R8 are spaced from each other at the shortest distance.

<Effect of Embodiment 1 Yielded by Distance Between Expander Roll and Transfer Roll>

As described earlier, the coating device 23 includes the expander roll E3 and the transfer roller H3 which are spaced from each other at a distance of not less than 1 m and not more than 10 m. The deposition device 24 includes the expander roll E4 and the transfer roller H4 which are spaced from each other at a distance of not less than 1 m and not more than 10 m. The cleaning device 25 includes the expander roll E5 and the transfer roller H5 which are spaced from each other at a distance of not less than 1 m and not more than 10 m. The drying device 26 includes the expander roll E6 and the transfer roller H6 which are spaced from each other at a distance of not less than 1 m and not more than 10 m. The inspection device 27 includes the expander roll E7 and the transfer roller H7 which are spaced from each other at a distance of not less than 1 m and not more than 10 m. In particular, a distance of a space between a transfer roller R4 and the transfer roller H4 of the deposition device 24, in which space a wrinkle easily conspicuously appears in the separator original sheet 12*b*, and a distance between the respective plurality of transfer rollers R6 of the drying device 26 are each set at 0.3 m, and a distance between the respective transfer rollers, which distance is different from each of the distance between the transfer roller R4 and the transfer roller H4 and the distance between the plurality of transfer rollers R6, is set to be not less than 0.4 m and not more than 0.6 m. The separator original sheet producing system 21 thus set makes it possible to produce the separator original sheet 12*b* without making any wrinkle in the separator original sheet 12*b* in the entire production process.

<Neck in>

The separator original sheet 12*b* on which tension is influenced in a machine direction thereof contracts (necks in) in a width direction thereof while expanding in the machine direction. In a case where the separator original sheet 12*b* uniformly contracts in the width direction, a wrinkle is considered to be less likely to appear in the separator original sheet 12*b*. Note, however, that since an edge of the separator original sheet 12*b* which extends in the width direction more easily contracts than a center of the separator original sheet 12*b* which extends in the width direction, a wrinkle is considered to easily appear in the separator original sheet 12*b* in a case where an amount of contraction of the edge of the separator original sheet 12*b* which extends in the width direction exceeds a predetermined threshold value.

Embodiment 1 shows an example in which a transfer roller immediately followed by an expander roll is provided so as to be spaced from the expander roll at a distance of not less than 1 m and not more than 10 m. Note, however, that the present invention is not limited to the above embodiment. A transfer roller immediately following an expander roll can also be provided so as to be spaced from the expander roll at a distance of not less than 1 m and not more than 10 m.

Embodiment 2

<Configuration of drying device 21*a*>

FIG. 11 is a diagram schematically illustrating a configuration of a drying device 21*a*. The drying device 21*a* dries a separator original sheet 12*b* that includes a separator original sheet 12*c* and a heat-resistant layer 4 that has been formed by coating the separator original sheet 12*c* with a coating solution, or a separator original sheet 12*b* that (i) includes a separator original sheet 12*c* with which a coating solution has been coated and (ii) is in a wet state without being subjected to a depositing step.

The drying device 21*a* includes a drying oven 41, a plurality of transfer rollers R8 that transfers the separator original sheet 12*b* while contacting a first surface of the separator original sheet 12*b* which first surface is different from a second surface of the separator original sheet 12*b* which second surface has been coated with a coating solution, an expander roll E8 that prevents appearance of a wrinkle in the separator original sheet 12*b* by expanding the separator original sheet 12*b* which has been dried by the drying oven 41, and a transfer roller H8 that is provided so as to be immediately followed by the expander roll E8. The expander roll E8 and the transfer roller H8 are spaced from each other at a distance of not less than 1 m and not more than 10 m. This makes it possible to obtain a work space for visual observation of the separator original sheet 12*b* in which the coating solution with which the second surface of the separator original sheet 12*b* has been coated is dried.

<Effect of Embodiment 2 Yielded by Distance Between Expander Roll and Transfer Roll>

As described earlier, the expander roll E8 is provided downstream of a place in which the transfer roller H8 is provided so as to be spaced from the expander roll E8 at a distance of more than 0.6 m and not more than 10 m. Further, the other transfer rollers R8 are spaced from each other at a distance that is set to be not less than 0.4 m and not more than 0.6 m. A separator original sheet producing system thus configured makes it possible to produce the separator original sheet 12*b* without making any wrinkle in the separator original sheet 12*b* in the entire production process.

CONCLUSION

In order to attain the object, a battery separator producing method in accordance with an aspect of the present invention includes the step of: a) producing a battery separator by causing a transfer system including a plurality of transfer rollers to transfer the battery separator, the transfer system further including at least one expander roll, (i) the at least one expander roll and (ii) a transfer roller immediately followed by or following the at least one expander roll being spaced from each other at a distance of not less than 1 m and not more than 10 m.

An "expander roll" herein means a transfer roller that (i) has a function of expanding or widening a battery separator and (ii) is used to prevent appearance of a wrinkle in the battery separator.

The expander roll can be, for example, a curved roller illustrated in (a) of FIG. 12 (a roller that is also called a banana roll and is shaped to be curved in a machine direction). The expander roll can also be, for example, an uncurved (not curved in the machine direction) linear roller illustrated in (b) of FIG. 12. Alternatively, the expander roll can also be, for example, a roller illustrated in (c) of FIG. 12 and having a spiral groove. Note that a sleeve (e.g., a rubber sleeve) that covers a shaft X can rotate while the shaft X does not rotate, or the shaft X can rotate. Either of the expander rolls illustrated in (a) and (b) of FIG. 12 allows an object to be transferred (e.g., film or coated film) to be expanded (prevents appearance of a wrinkle in the object to be transferred) in a case where the object to be transferred is developed and spread in a direction in which the object to be transferred is transferred.

Note that the curved roller is advantageous in that a residue due to friction is less likely to be generated. The uncurved linear roller is advantageous in that a central part of the film which extends in a width direction thereof is less likely to be excessively stretched or an edge of the film (an edge portion of the film which extends in the width direction) and its vicinity are less likely to sag.

The expander roll has a surface that is made of rubber (e.g., ethylene-propylene rubber or acrylonitrile-butadiene rubber), a flexible material such as silicon, or a rigid material such as metal.

The expander roll preferably has a smooth and curved surface. The expander roll which has such a surface makes it less likely for, for example, a residue generated by friction to collect on a roller. This makes it possible to prevent a phenomenon such that a residue generated by friction and collecting on the roller adheres to a film or coated film F. Further, the expander roll in accordance with an aspect of the present invention is preferably a roller that extends in a width direction of the film.

Note here that the roller that extends in the width direction of the film refers to a roller whose machine direction is substantially parallel to the width direction of the film.

According to the feature, an expander roll is provided, and the expander roll and a transfer roller immediately followed by or following the expander roll are spaced from each other at a distance of not less than 1 m. This makes it possible to obtain a work space for production of a battery separator while causing the expander roll to prevent appearance of a wrinkle in the battery separator.

Since the expander roll and a transfer roller immediately followed by or following the expander roll are spaced from each other at a distance of not more than 10 m, a wrinkle that is insufficiently prevented even by the expander roll is less likely to appear in the battery separator.

The battery separator producing method in accordance with an aspect of the present invention is preferably configured such that any paired adjacent transfer rollers of the plurality of transfer rollers are spaced from each other at a distance of less than 1 m.

With the configuration, since a distance at which paired adjacent transfer rollers are spaced from each other is set to be less than 1 m, it is possible to prevent, at each place in the transfer system, appearance of a wrinkle in the battery separator which is transferred by the transfer system.

The battery separator producing method in accordance with an aspect of the present invention is preferably configured such that: the battery separator includes a laminated porous film including a polyolefin porous film and a porous layer provided on the polyolefin porous film, the battery separator producing method further including the steps of: b) coating the polyolefin porous film with a coating solution; and c) causing the polyolefin porous film which has been coated with the coating solution to contact a poor solvent of the coating solution, the laminated porous film being transferred in the step c) by paired adjacent transfer rollers of the plurality of transfer rollers, the paired adjacent transfer rollers being spaced from each other at a distance of not more than 0.8 m.

With the configuration, in the step c) in which a wrinkle easily appears in the laminated porous film, appearance of a wrinkle in the laminated porous film can be prevented by making a distance between the rollers extremely short.

The battery separator producing method in accordance with an aspect of the present invention is preferably configured such that: the battery separator includes a laminated porous film including a polyolefin porous film and a porous layer provided on the polyolefin porous film, the battery separator producing method further including the step of: d) cleaning the laminated porous film including the polyolefin porous film and the porous layer, the porous layer having been formed by coating the polyolefin porous film with a coating solution, the laminated porous film being transferred by paired adjacent transfer rollers of the plurality of transfer rollers in a solution contained in a cleaning tank used in the step d), the paired adjacent transfer rollers being spaced from each other at a distance of not more than 0.8 m.

With the configuration, in the step d) in which a wrinkle easily appears in the laminated porous film due to a resistance of the solution contained in the cleaning tank, appearance of a wrinkle in the laminated porous film can be prevented by making a distance between the rollers extremely short.

The battery separator producing method in accordance with an aspect of the present invention is preferably configured such that: the battery separator includes a laminated porous film including a polyolefin porous film and a porous layer provided on the polyolefin porous film, the battery separator producing method further including the step of: e) drying the laminated porous film, the laminated porous film being transferred in the step e) by paired adjacent transfer rollers of the plurality of transfer rollers, the paired adjacent transfer rollers being spaced from each other at a distance of not more than 0.8 m.

The configuration makes it possible to prevent appearance of a wrinkle in the laminated porous film which is subjected to the step e) in which a conspicuous wrinkle easily appears in the laminated porous film due to, for example, contraction caused by drying.

The battery separator producing method in accordance with an aspect of the present invention is preferably configured to further include the step of: f) inspecting the battery separator, the at least one expander roll being used in the step f).

With the configuration, since the at least one expander roll and a transfer roller immediately followed by or following the at least one expander roll are spaced from each other at a distance of not less than 1 m, it is possible to obtain a length for which the battery separator is to be transferred so as to be inspected.

The battery separator producing method in accordance with an aspect of the present invention is preferably configured such that in the step f), the battery separator is given a mark for identifying a defect in the battery separator which defect has been detected by the inspection.

With the configuration, the at least one expander roll which prevents appearance of a wrinkle in the battery separator by expanding the battery separator which has been inspected in the step f) and a transfer roller immediately followed by or following the at least one expander roll are spaced from each other at a distance of not less than 1 m. This makes it possible to dry, before the battery separator is transferred to the at least one expander roll immediately following the transfer roller or the transfer roller immediately following the at least one expander roll, ink with which the battery separator has been applied so as to be marked in accordance with a result of the inspection.

The battery separator producing method in accordance with an aspect of the present invention is preferably configured such that: the battery separator includes a laminated porous film including a polyolefin porous film and a porous layer provided on the polyolefin porous film, the battery separator producing method further including the step of: g) cleaning the laminated porous film including the polyolefin porous film and the porous layer, the porous layer having been formed by coating the polyolefin porous film with a coating solution, the at least one expander roll being provided downstream of a transfer roller that is contacted first by the laminated porous film which has come out of a cleaning tank used in the step g).

With the configuration, in a case where a transfer roller that is contacted first by the laminated porous film which has come out of the cleaning tank is assumed to be the transfer roller which is provided so as to be immediately followed by the at least one expander roll, it is possible to obtain a space for cleaning of the transfer roller which tends to be easily made dirty.

The battery separator producing method in accordance with an aspect of the present invention is preferably configured such that: the battery separator includes a laminated porous film including a polyolefin porous film and a porous layer provided on the polyolefin porous film, the battery separator producing method further including the step of: h) solidifying a coating solution with which the polyolefin porous film has been coated, the at least one expander roll being provided downstream of a transfer roller that is contacted first by the laminated porous film which has come out of a depositing tank used in the step h).

With the configuration, in a case where a transfer roller that is contacted first by the laminated porous film which has come out of the depositing tank is assumed to be the transfer roller which is provided so as to be immediately followed by the at least one expander roll, it is possible to obtain a space for cleaning of the transfer roller which tends to be easily made dirty by a residual component that has adhered to the laminated porous film in the depositing tank.

The battery separator producing method in accordance with an aspect of the present invention is preferably configured such that: the battery separator includes a laminated porous film including a polyolefin porous film and a porous layer provided on the polyolefin porous film, the battery separator producing method further including the step of: i) coating the polyolefin porous film with a coating solution, the at least one expander roll being provided on a downstream side of the laminated porous film which is transferred above a coating section by which the step i) is carried out.

In the step i), in a case where a transfer roller for the laminated porous film which is transferred above the coating section is located right above the coating section, dust (foreign matter) may fall from the transfer roller to the coating section and then be contained in the coating solution. Since dust that is contained in the coating solution is incorporated into the porous layer, the dust is difficult to remove. In view of this, the at least one expander roll is provided on the downstream side of the laminated porous film which is transferred above the coating section, and a transfer roller immediately followed by the at least one expander roll is provided on the upstream side of the laminated porous film so as to be spaced from the at least one expander roll at a distance of not less than 1 m. This allows no transfer roller to be provided right above the coating section. Therefore, it is possible to remove fear that dust (foreign matter) may fall from a transfer roller to the coating section.

The battery separator producing method in accordance with an aspect of the present invention is preferably configured such that: the battery separator includes a laminated porous film including a polyolefin porous film and a porous layer provided on the polyolefin porous film, the battery separator producing method further including the step of: j) drying the laminated porous film including the polyolefin porous film and the porous layer, the porous layer having been formed by coating the polyolefin porous film with a coating solution, the at least one expander roll expanding the laminated porous film which has been dried by a drying oven used in the step j).

With the configuration, while preventing appearance of a wrinkle, it is possible to obtain a length for which the laminated porous film which has been dried by the drying oven is to be transferred so as to be visually observed.

In order to attain the object, a battery separator producing apparatus in accordance with an aspect of the present invention includes: a transfer system including a plurality of transfer rollers and transferring a battery separator, the transfer system further including at least one expander roll, (i) the at least one expander roll and (ii) a transfer roller immediately followed by or following the at least one expander roll being spaced from each other at a distance of not less than 1 m and not more than 10 m.

The present invention is not limited to the embodiments, but can be altered by a skilled person in the art within the scope of the claims. An embodiment derived from a proper combination of technical means each disclosed in a different embodiment is also encompassed in the technical scope of the present invention.

REFERENCE SIGNS LIST

4 Heat-resistant layer (porous layer)
12b Separator original sheet (battery separator, laminated porous film)
12c Separator original sheet (polyolefin porous film)
21 Separator original sheet producing system (battery separator producing apparatus)
21a Drying device
22 Transfer system
23 Coating device
24 Deposition device
25 Cleaning device
26 Drying device
27 Inspection device
30 Coating section
40 Marking section
R3, R4, R5, R6, R7, R8, R9 Transfer roller
R3a, R3b Transfer roller
E3, E5, E7, E8, E9 Expander roll
H3, H5, H7, H8, H9 Transfer roller

The invention claimed is:
1. A battery separator producing method comprising the step of:
   a) producing a battery separator by causing a transfer system including a plurality of transfer rollers to transfer the battery separator,
   the transfer system further including at least one expander roll,
   (i) the at least one expander roll and (ii) a transfer roller immediately followed by or following the at least one expander roll being spaced from each other at a distance of not less than 1 m and not more than 10 m.
2. The battery separator producing method as set forth in claim 1, wherein any paired adjacent transfer rollers of the plurality of transfer rollers are spaced from each other at a distance of less than 1 m.
3. The battery separator producing method as set forth in claim 1, wherein:
   the battery separator includes a laminated porous film including a polyolefin porous film and a porous layer provided on the polyolefin porous film,
   said battery separator producing method further comprising the steps of:
   b) coating the polyolefin porous film with a coating solution; and c) causing the polyolefin porous film which has been coated with the coating solution to contact a poor solvent of the coating solution, the laminated porous film being transferred in the step c) by paired adjacent transfer rollers of the plurality of transfer rollers, the paired adjacent transfer rollers being spaced from each other at a distance of not more than 0.8 m.

4. The battery separator producing method as set forth in claim 1, wherein:

the battery separator includes a laminated porous film including a polyolefin porous film and a porous layer provided on the polyolefin porous film, said battery separator producing method further comprising the step of:

d) cleaning the laminated porous film including the polyolefin porous film and the porous layer, the porous layer having been formed by coating the polyolefin porous film with a coating solution, the laminated porous film being transferred by paired adjacent transfer rollers of the plurality of transfer rollers in a solution contained in a cleaning tank used in the step d), the paired adjacent transfer rollers being spaced from each other at a distance of not more than 0.8 m.

5. The battery separator producing method as set forth in claim 1, wherein:

the battery separator includes a laminated porous film including a polyolefin porous film and a porous layer provided on the polyolefin porous film, said battery separator producing method further comprising the step of:

e) drying the laminated porous film, the laminated porous film being transferred in the step e) by paired adjacent transfer rollers of the plurality of transfer rollers, the paired adjacent transfer rollers being spaced from each other at a distance of not more than 0.8 m.

6. The battery separator producing method as set forth in claim 1, further comprising the step of:

f) inspecting the battery separator, the at least one expander roll being used in the step f).

7. The battery separator producing method as set forth in claim 6, wherein in the step f), the battery separator is given a mark for identifying a defect in the battery separator which defect has been detected by the inspection.

8. The battery separator producing method as set forth in claim 1, wherein:

the battery separator includes a laminated porous film including a polyolefin porous film and a porous layer provided on the polyolefin porous film, said battery separator producing method further comprising the step of:

g) cleaning the laminated porous film including the polyolefin porous film and the porous layer, the porous layer having been formed by coating the polyolefin porous film with a coating solution, the at least one expander roll being provided downstream of a transfer roller that is contacted first by the battery separator which has come out of a cleaning tank used in the step g).

9. The battery separator producing method as set forth in claim 1, wherein:

the battery separator includes a laminated porous film including a polyolefin porous film and a porous layer provided on the polyolefin porous film, said battery separator producing method further comprising the step of:

h) solidifying a coating solution with which the polyolefin porous film has been coated, the at least one expander roll being provided downstream of a transfer roller that is contacted first by the laminated porous film which has come out of a depositing tank used in the step h).

10. The battery separator producing method as set forth in claim 1, wherein:

the battery separator includes a laminated porous film including a polyolefin porous film and a porous layer provided on the polyolefin porous film, said battery separator producing method further comprising the step of:

i) coating the polyolefin porous film with a coating solution, the at least one expander roll being provided on a downstream side of the laminated porous film which is transferred above a coating section by which the step i) is carried out.

11. The battery separator producing method as set forth in claim 1, wherein:

the battery separator includes a laminated porous film including a polyolefin porous film and a porous layer provided on the polyolefin porous film, said battery separator producing method further comprising the step of:

j) drying the laminated porous film including the polyolefin porous film and the porous layer, the porous layer having been formed by coating the polyolefin porous film with a coating solution, the at least one expander roll expanding the laminated porous film which has been dried by a drying oven used in the step j).

12. A battery separator producing apparatus comprising:

a transfer system including a plurality of transfer rollers and transferring a battery separator, the transfer system further including at least one expander roll, (i) the at least one expander roll and (ii) a transfer roller immediately followed by or following the at least one expander roll being spaced from each other at a distance of not less than 1 m and not more than 10 m.

* * * * *